(12) United States Patent
Yu et al.

(10) Patent No.: US 8,832,844 B2
(45) Date of Patent: Sep. 9, 2014

(54) FAST SWITCHING FOR MULTIMEDIA INTERFACE SYSTEM HAVING CONTENT PROTECTION

(75) Inventors: Qing Yu, Santa Clara, CA (US); Jieyang Xu, Shanghai (CN); Ding Lu, Sunnyvale, CA (US)

(73) Assignee: Parade Technologies, Ltd., Grand Cayman (KY)

( * ) Notice: Subject to any disclaimer, the term of this patent is extended or adjusted under 35 U.S.C. 154(b) by 180 days.

(21) Appl. No.: 12/959,241

(22) Filed: Dec. 2, 2010

(65) Prior Publication Data

US 2011/0134330 A1 Jun. 9, 2011

Related U.S. Application Data

(60) Provisional application No. 61/266,998, filed on Dec. 4, 2009.

(51) Int. Cl.
*G06F 7/04* (2006.01)
*H04N 21/426* (2011.01)
*H04N 5/268* (2006.01)
*H04N 21/438* (2011.01)

(52) U.S. Cl.
CPC .......... *H04N 5/268* (2013.01); *H04N 21/4263* (2013.01); *H04N 21/4384* (2013.01)
USPC ......................................................... 726/26

(58) Field of Classification Search
None
See application file for complete search history.

(56) References Cited

U.S. PATENT DOCUMENTS

| 2008/0083035 A1* | 4/2008 | Dong et al. | ...................... 726/26 |
| 2010/0177892 A1* | 7/2010 | Choi et al. | ..................... 380/201 |
| 2011/0013772 A1* | 1/2011 | Roethig et al. | ................ 380/200 |

\* cited by examiner

*Primary Examiner* — Pramila Parthasarathy
(74) *Attorney, Agent, or Firm* — Fenwick & West LLP

(57) ABSTRACT

A system and a method are disclosed for enabling fast switching in a multimedia interface system having content protection. By using a partial port receiver to decode a portion of the input at input ports that are not being output to a multimedia sink, the design of the switching system is simplified and silicon costs are reduced. Additionally, the switching system and method reduces the switching delay by maintaining content protection signaling with all of the input ports. This eliminates the need for re-authentication when a new multimedia source is selected.

21 Claims, 7 Drawing Sheets

FAST SWITCHING FOR MULTIMEDIA INTERFACE SYSTEM HAVING CONTENT PROTECTION

CROSS REFERENCE TO RELATED APPLICATIONS

This application claims the benefit of, and priority to, U.S. Provisional Application No. 61/266,998, filed Dec. 4, 2009, which is incorporated by reference in its entirety.

BACKGROUND

1. Field of Art

The disclosure generally relates to the field of multimedia switching, receiving and repeating.

2. Description of the Related Art

A multimedia interface system transports multimedia signals from a multimedia source to a multimedia sink. Examples of a multimedia source include a computer, a DVD player, a set-top box, a game consoles or another device producing multimedia output. Examples of a multimedia sink include a monitor, a television, an audio/visual (A/V) receiver or other device which receives and presents video and/or audio. When a system includes more than one multimedia source, the system switches between different multimedia sources to modify the multimedia source providing data to the multimedia sink. Between the multimedia source and the multimedia sink, there is a multimedia link including a transmitter, a switch and a receiver. Examples of multimedia links in such a multimedia switching system are DISPLAYPORT, HDMI and DVI.

Often, the multimedia link is protected by a digital content protection scheme, e.g., HDCP. Before sending content-protected data, the transmitting device initiates an authentication process to confirm that the receiver is authorized to receive the data. Once the receiver has been authenticated, the transmitter encrypts the data stream to prevent eavesdropping and sends the encrypted data stream to the receiver. Hence, when switching to a second multimedia source, the second multimedia source initially starts content protection procedures before sending multimedia content to the multimedia sink. However, the authentication confirming that the receiver is authorized to receive data from the second multimedia source is time consuming. Normally, several seconds are required for the second multimedia source to authenticate that the multimedia sink is permitted to receive multimedia data from the second multimedia source. After the authentication process is completed, the second multimedia source begins transmitting content to the multimedia sink; however, the delay caused by authentication is disruptive for many content viewers.

Conventional techniques for reducing the delay caused by authorization of the multimedia sink by a multimedia source require a dedicated receiver and content decryption block for each input port of a multimedia switch. A logic switch selects an input from multiple input ports for communication to the multimedia sink. Hence, input ports are continuously connected to various multimedia sources so that the multimedia sink is authenticated to receive data from the various multimedia sources. This continuous connection and authorization allows switching from a first input port to a second input port without disrupting communication of multimedia content to the multimedia sink for display.

While this conventional method reduces switching delay by removing the need for re-authentication after switching to a new multimedia source, drawbacks remain. In particular, each port completely decodes and decrypts received data, increasing system cost and computing resources.

An alternative configuration reducing the delay in switching between multimedia sources uses two receiver cores. A main receiver core is dedicated for the currently selected port and receives multimedia content from a multimedia source coupled to the selected port. A roving receiver core receives data from different multimedia sources coupled to different background ports which are not selected. The background port providing data to the roving receiver core rotates over time, so that at different time intervals the roving receiver core receives data from different non-selected background ports.

In such an alternate configuration, each input port is an HDMI input port coupled to a high-bandwidth digital content protection (HDCP) engine. The HDCP engine coupled to the selected input port receives HDCP encryption status signaling from the main receiver core. HDCP engines coupled to the background, or non-selected, ports receive HDCP encryption status signaling from the roving receiver core. When the HDCP engine for a background port is connected to the roving receiver core, the HDCP engine for the background port uses HDCP encryption status signaling from the roving receiver core. When the HDCP engine for a background port is not connected to the roving receiver, the HDCP engine operates in an open-loop mode using assumed HDCP encryption status signaling. However, when an HDCP engine operates in an open-loop mode, the HDCP engine may miss HDCP encryption data indicating a status change. Additionally, this configuration is limited to application in an HDMI system with HDCP content protection.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Various embodiments provide a system and method for reducing the cost of a switch while also reducing the switch time caused by authorizing a content protection link. Additionally, the disclosed system and method also improve the functional reliability of a switch or other receiver device. In an embodiment, a multimedia interface system includes a multimedia switch having two or more inputs and one or more outputs. The inputs may have different interface formats, such as DISPLAYPORT, HDMI, DVI or combinations of input types. The output, or outputs, may have a variety of formats, such as DISPLAYPORT, HDMI, DVI, TMDS. Different outputs may have different formats. Additionally, the multimedia interface system supports content protection, such as HDCP, DPCP (DISPLAYPORT Content Protection) or any other content protection method.

Although described for use in conjunction with multimedia switches, the described method is also applicable to any multiple input format multimedia receiver or display controller having at least one input protected by content protection.

Figure 1:
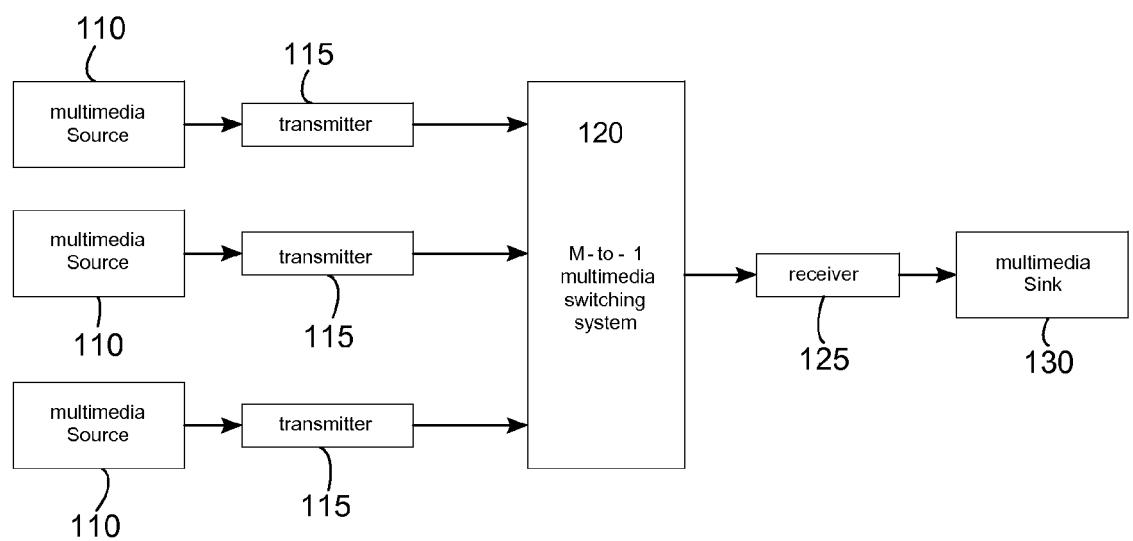
FIG. 1 is block diagram of a multimedia system including a multimedia switching system.

FIG. 1 is block diagram of one embodiment of a multimedia system including a multimedia switching system. This multimedia system includes one or more multimedia sources 110, one or more transmitters 115, an M-to-1 multimedia switching system 120, at least one receiver 125, and at least one multimedia sink 130. Each multimedia source 110 is communicatively coupled to a transmitter 115 and each multimedia sink 130 is communicatively couple to a receiver 125. The transmitters 115 are communicatively coupled to the M-to-1 switch. The M-to-1 switch is also communicatively coupled to the receiver 125.

Operationally, the multimedia source 110 outputs data to the transmitter 115. The M-to-1 multimedia switching system 120 selects which input from the transmitters 115 will be output to the receiver 125. Before sending content protected data, the transmitter 115 initiates an authentication process to confirm that the receiver 125 is authorized to receive the data. Once the receiver has been authorized and the data has been sent to the receiver 125, the receiver 125 transmits the data to the multimedia sink 130.

Figure 2:
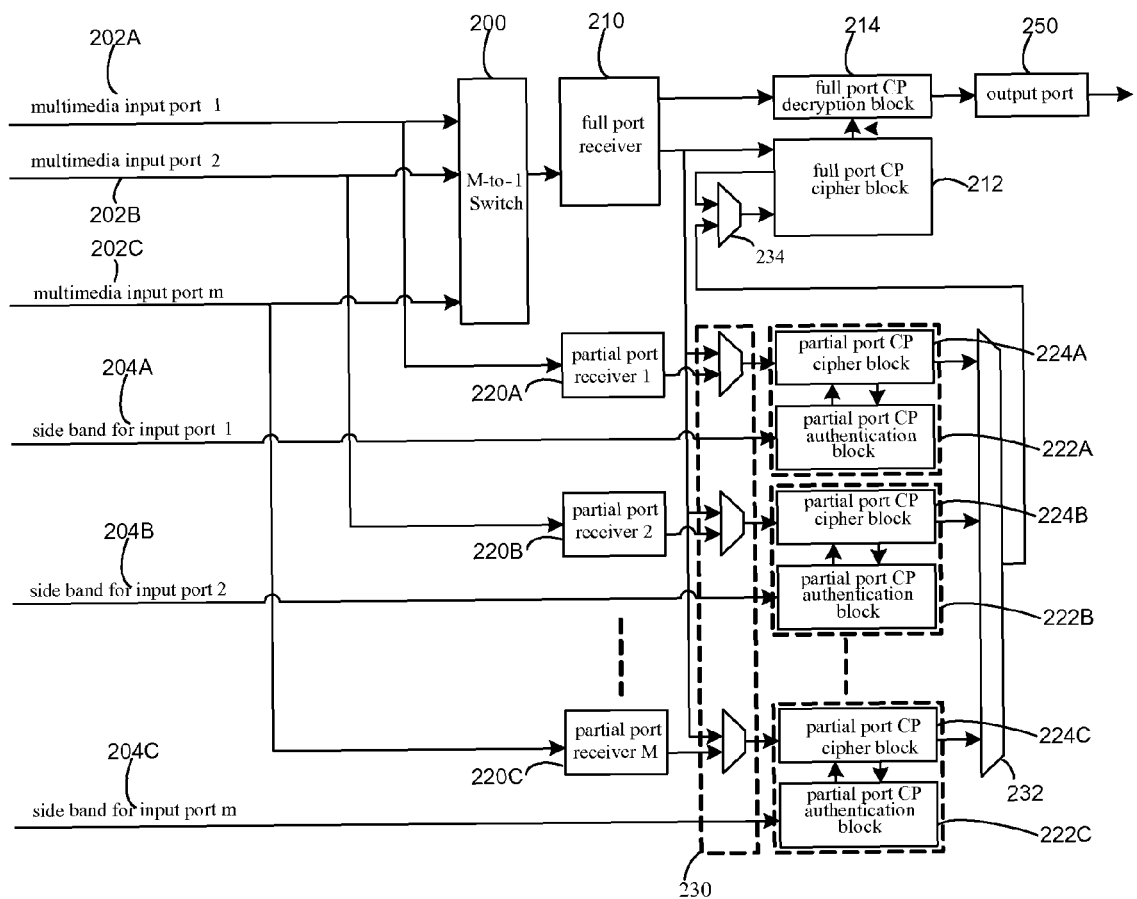
FIG. 2 is a block diagram of a multimedia switching system including a full port receiver and three partial port receivers.

FIG. 2 is a block diagram of a switching system including an M-to-1 switch 200, a full port receiver 210, a full port content protection cipher block 212, a full port content protection decryption block 214, one or more partial port receivers 220, one or more partial port content protection authentication blocks 222 A-M (M corresponding to the last of the blocks), one or more partial port content protection cipher blocks 224 and one or more multiplexers. The multiplexers include a content protection signal select 230, a content protection state select 232 and content protection state load select 234. The input ports 202A-M (M corresponding to the last of the ports) of the system are associated with side band inputs 204A-M (M corresponding to the last of the input lines). The output of the system is output port 250. In the switching system shown by FIG. 2, the multimedia input ports 202 may receive different types of data, such as DISPLAYPORT main link, HDMI data and clock channel, DVI data and clock channel or other multimedia formats. If an input port receives DISPLAYPORT data, the side band input 204 for that port receives AUX channel data. Similarly, if an input port receives HDMI or DVI data, the side band input 204 for that port receives DDC channel data.

By way of example in describing FIG. 2, it is noted that "full port" refers to an input port which is fully decoded and decrypted. In addition, "partial port" refers to an input port where a subset of the data received by the input port is decoded. Further, "CP" denotes "content protection." Also, "HDCP" denotes "High-Bandwidth Digital Content Protection." in addition, "DPCP" denotes "DISPLAYPORT Content Protection." Next, "CP state" denotes "content protection cipher state." Finally, "CP signaling" denotes "content protection encryption status signaling."

In an example embodiment, the M-to-1 switch 200 shown in FIG. 2 is an M to 1 cross point switch, where M comprises an integer value greater than 1. The input ports 202 are connected to multiple multimedia interface ports which receive data from multimedia sources, for example, the multimedia sources might include a DVD player connected by HDMI, a BLU-RAY player connected by HDMI, and Home Theater PC (HTPC) connected by DISPLAYPORT. In an embodiment, the BLU-RAY player and HTPC need content protection signaling to transmit, while the DVD player does not. The output port of the M-to-1 switch is connected to a full port receiver 210.

The full port receiver 210 fully decodes received multimedia input signals. In an embodiment, the full port receiver 210 includes a physical layer and a link layer. The decoded signal output by the full port receiver 210 includes CP signaling and multimedia data. The CP signaling is further sent to full port content protection cipher block 212. The multimedia data is further sent to a full port content protection decryption block 214.

The full port content protection cipher block 212 includes one or more content protection ciphers. The CP state is held in those content protection ciphers. When a new source port is selected to communicate data to the output port, the CP state in the full port content protection cipher block 212 is loaded with the CP state stored in the partial port content protection cipher block 224 for the newly-selected port. For example, when switching from port 1 to port 2, the CP state stored in the partial port content protection cipher block 224B associated with port 2 is selected and loaded to the full port content protection cipher block 212 at a proper time. The full port content protection cipher block 212 then continues updating the CP state according to the content protection encryption status signaling from the full port receiver 210. Meanwhile, the partial port receiver associated with port 2 220B, partial port content protection authentication block associated with port 2 222B and partial port content protection cipher block associated with port 2 224B remain operational and keep the CP state associated with port 2 synchronized with the multimedia source device coupled to port 2. When switching from port 2 to a different port and back to port 2, the above-described process is repeated to load the full port content protection cipher block 212 and allow the full port content protection cipher block 212 to continue updating the CP state.

The full port content protection decryption block 214 performs decryption according to a current content protection scheme. The full port content protection decryption block 214 receives decryption keys from the full port content protection cipher block 212 and receives encrypted multimedia data from the full port receiver 210. The multimedia data is decrypted using the received decryption keys and decrypted multimedia data is output from the full port content protection decryption block 214 to the output port 250.

The partial port receiver 220 decodes the minimum amount of input data necessary to obtain CP signaling. Data from multiple channels or link from the multimedia input are not decoded if the data is not used to obtain CP signaling. By limiting the amount of data decoded, the partial port receiver 220 provides cost savings while enabling fast switching and high functional reliability.

The partial port content protection authentication block 222 responds to content protection requests from multimedia sources connected to the switching system that employ content protection in an embodiment, multimedia sources perform authentication via a side-band channel 204. After receiving a command from a multimedia source, the partial port content protection authentication block 222 generates a CP control signal which is transmitted to the partial port content protection cipher block 224. The partial port content protection authentication block 222 also receives an authentication value from partial port content protection cipher block 224 and returns the authentication value to a requesting multimedia source.

The partial port content protection cipher block 224 includes one or more content protection ciphers. The CP state is determined by a content protection ciphers. CP state data is synchronized with a corresponding multimedia source. When a partial port is not selected for communicating data to the multimedia sink, the partial port content protection cipher block 224 uses information from partial port receiver 220 to trigger a CP state change. When a partial port is selected for communicating data to the multimedia sink, the partial port content protection cipher block 224 transfers the CP state to the full port content protection cipher block 212. Meanwhile, the partial port content protection cipher block 224 and full port content protection cipher block 212 receive CP signaling from the full port receiver 210 and update the CP state accordingly.

The CP state in partial port content protection cipher block 224 is synchronized with the multimedia source coupled to the partial port content protection cipher block 224. When the port associated with a partial port content protection cipher block 224 is not selected, the partial port content protection cipher block 224 monitors CP signaling from partial port receiver 220. When the port associated with the partial port content protection cipher block 224 is selected, the partial port content protection cipher block 224 monitors CP signaling from the full port receiver 210.

Figure 3:
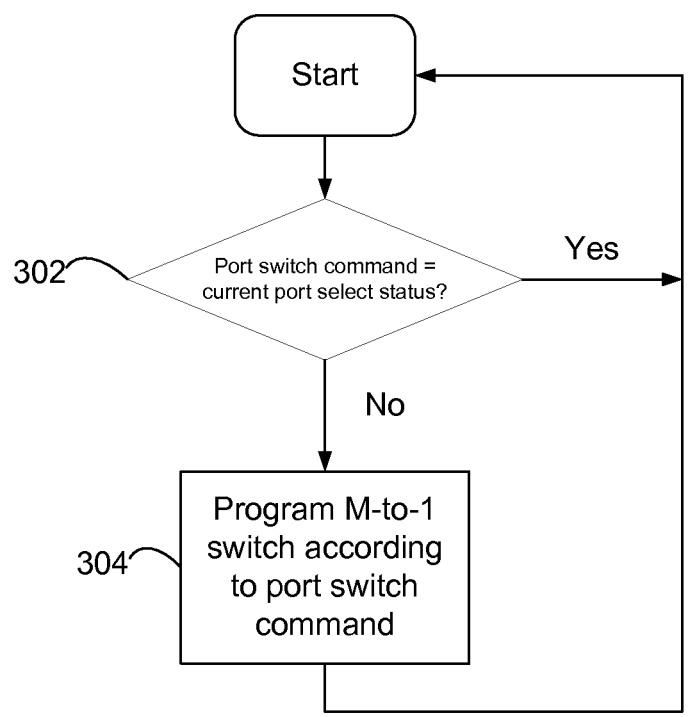
FIG. 3 is a flow chart of one embodiment of a method for operating the M-to-1 switch in FIG. 2.

FIG. 3 is a flow chart of one embodiment of a method of operating the M-to-1 switch 200. The system repeatedly monitors 302 for a port switch command and, upon receiving a port switch command indicating a port distinct from the currently selected port, programs 304 the M-to-1 switch to couple the newly selected port to an output port. This allows communication of data from the selected port to the output port.

Figure 4:
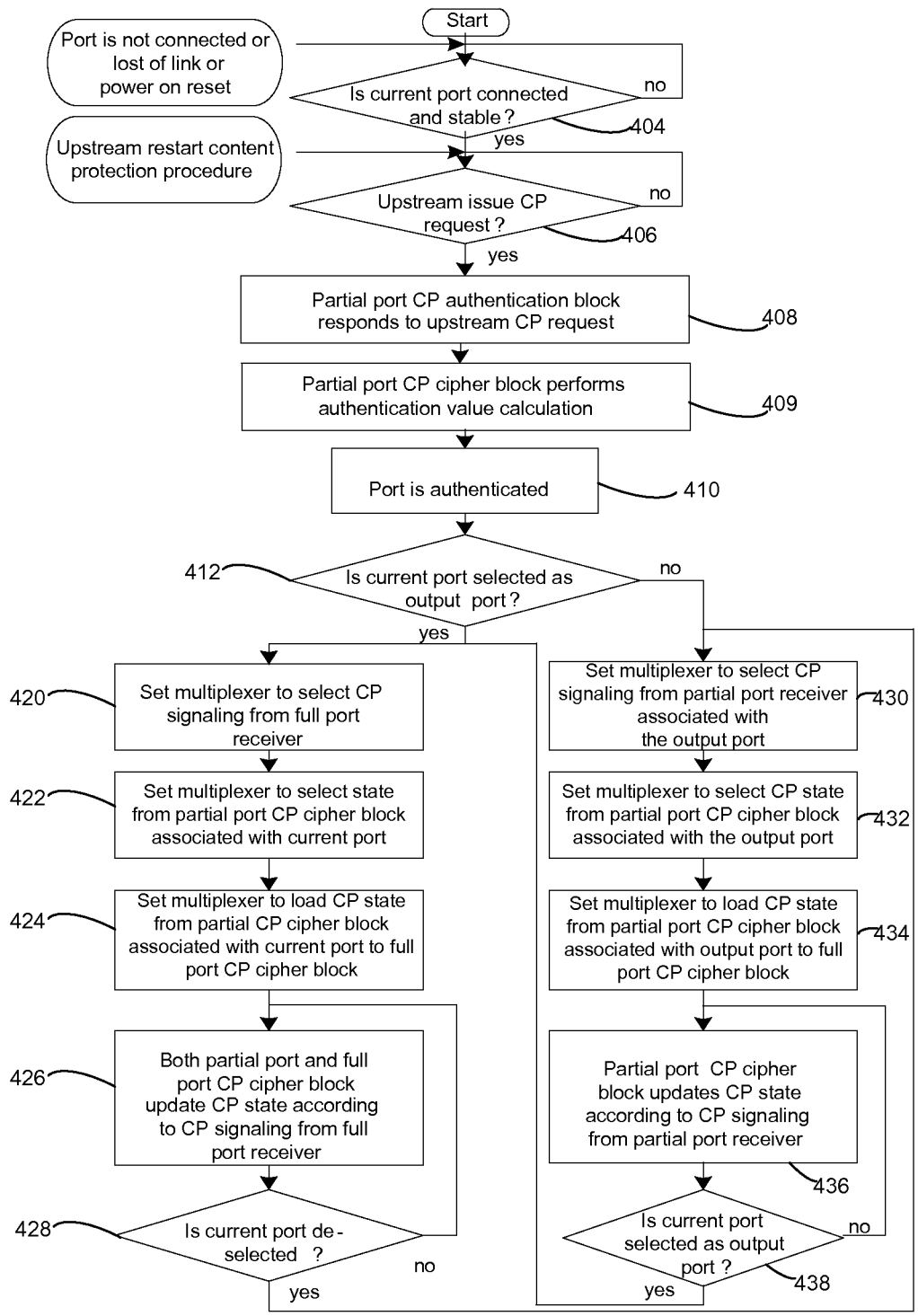
FIG. 4 is a flow chart of one embodiment of a method for establishing a content protection link at an port of FIG. 2.

FIG. 4 is a flow chart of an embodiment of a method for content protection of an input port. Each input port is associated with a dedicated partial port content protection authentication block 222 and a partial port content protection cipher block 224. The partial port content protection authentication block 222 and the partial port content protection cipher block 224 work together to establish a content protection link for the associated input port.

The process starts and determines 404 if a current port is connected and stable. If not, the process reverts to waiting until that state is reached. After determining 404 that the current port is connected and stable, the process determines whether there is an upstream issue CP request. If not, the process waits. If so, the process receives 406 a content protection request from the multimedia source coupled to the current port, the partial port content protection authentication block 222 responds 408 to the received content protection request and the partial port content protection cipher block 224 performs 409 an authentication value calculation to authenticate the current port.

After authenticating 410 the current port, the switching system determines 412 whether the current port is selected as the output port 250. If the current port is selected as the output port 250, a multiplexer to select CP signaling is configured 420 to identify CP signaling from the full port receiver 210. A multiplexer for selecting content protection state is then configured 422 to select a CP state from the partial port content protection cipher block 224 associated with the current port. An additional multiplexer for loading a CP state is configured 424 to select the CP state from the partial port content protection cipher block 224 and communicate the included CP state to the full port content protection cipher block 212. The partial port content protection cipher block 224 and the full port content protection cipher block 212 then update 426 the CP state associated with the current port based on CP signaling received from the full port receiver 210. Step 426 repeats while the current port is selected as the output port 250.

If the current port is not selected 428 as the output port, the multiplexer to select CP signaling is configured 430 to select CP signaling from the partial port receiver associated with the current port. The multiplexer for selecting CP state is configured 432 to select CP state from a partial port content protection cipher block associated with the port selected as the output port and the multiplexer for loading CP state is configured 434 to communicate the CP state from the partial port content protection cipher block associated with the port selected as the output port to the full port content protection cipher block. The partial port content protection cipher associated with the current port subsequently updates 436 the CP state based on CP signaling received from the partial port receiver associated with the current port. A determination 438 is then made whether the current port is selected as the output port, and the appropriate steps are performed, as described above, based on the results of the determination.

Figure 5:
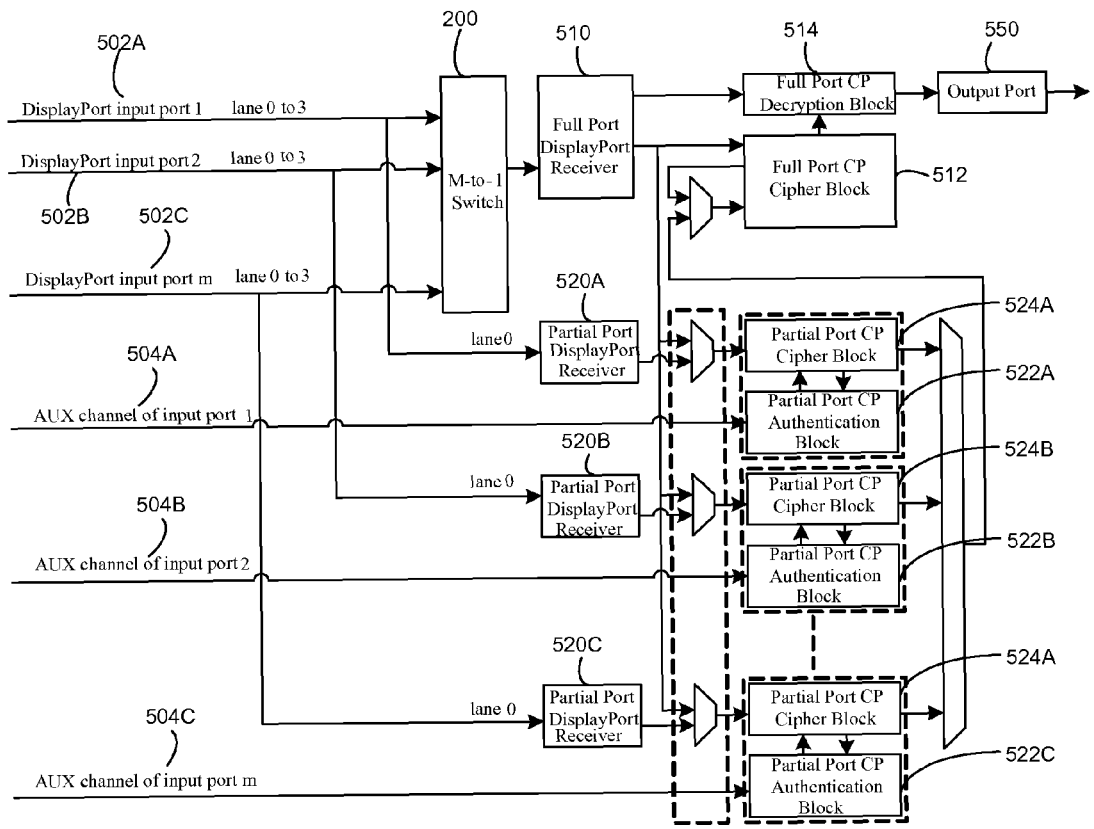
FIG. 5 illustrates a block diagram of a multimedia switching system with DISPLAYPORT inputs.

FIG. 5 illustrates an example implementation of the switching system described above in conjunction with FIG. 2 and of the switching method described above in conjunction with FIG. 4. In the example of FIG. 5, the input ports receive content formatted in a DISPLAYPORT format, or type. The content protection used in DISPLAYPORT data may be HDCP or DPCP. It is noted that this is just an example and the principles described herein may applicable to other formats and corresponding data types.

The system includes input ports 502, each of which has a related AUX channel input 504 which transmits a subset of the lanes included in the input port 502. Each of the 1-M input ports 502 are communicatively coupled to an M-to-1 switch 200 which outputs data to the full port receiver 510. The full port receiver 510 is communicatively coupled to a full port CP decryption block 514 and a full port CP cipher block 512. The full port decryption block 514 is communicatively coupled to an output port 550. The input ports 502 are communicatively coupled to partial port receivers 520 and the auxiliary input ports 504 are communicatively coupled to the partial port CP authentication blocks 522. The partial port CP cipher blocks 524 are communicatively coupled to the partial port authentication blocks 522, partial port receivers 520 and full port receiver 510.

As shown in FIG. 5, the full port receiver 510 decodes all received lanes of data from the selected input port 502. In a four-lane configuration, the full port receiver 510 decodes data from lane 0 to lane 3. In a two-lane configuration, the full port receiver 510 decodes data from lane 0 to lane 1. Similarly, in a one-lane configuration, the full port receiver 510 decodes data from lane 0.

The port content protection decryption block 514 decrypts data received from the full port receiver 510 and outputs the decrypted data for transmission to the multimedia sink via the output port 550. When switching to a new port, the CP state of the full port content protection cipher block 512 is loaded with the value stored in the partial port content protection cipher block 524 associated with the new port and continues to update the CP state using CP signaling from the full port receiver block 510.

When receiving DISPLAYPORT input, as shown in FIG. 5, the partial port receivers 520 decode data from lane 0. In the DISPLAYPORT format, content protection encryption status signaling is indicated by control signals including scrambler reset (SR/CPSR) and blank start (BS/CPBS). A BS signal is transmitted every line. Every $512^{th}$ BS signal is replaced by a SR signal. When encryption is enabled, a multimedia source transmitting DISPLAYPORT data replaces each BS/SR in the DISPLAYPORT link with CPBS/CPSR, respectively. When encryption is disabled, the multimedia source transmitting DISPLAYPORT data does not replace BS/SR in the DISPLAYPORT link. When CPSR is transmitted, a flame key is re-calculated. Hence, decoding data from lane 0 allows a partial port receiver 520 to obtain the content protection encryption status signaling associated with the multimedia source associated with the partial port receiver 520.

The partial port content protection authentication block 522 and the partial port content protection cipher block 524 are configured to response to a CP authentication request from the multimedia source as needed. This allows the partial port content protection authentication block 522 and the partial port content protection cipher block 524 to respond to a CP authentication request when it is received. After an input port associated with a partial port receiver 520 is authenticated, the input port maintains a CP state synchronized with the multimedia source. The partial port content protection cipher block 524 monitors CP signaling from partial port DISPLAYPORT receiver 520, or full port DISPLAYPORT receiver 510, and updates the CP state accordingly. In an embodiment, a link integrity check is also performed using lane 0. If there is a link integrity failure, the partial port content protection cipher block 524 asserts an interrupt to notify the multimedia source.

Figure 6:
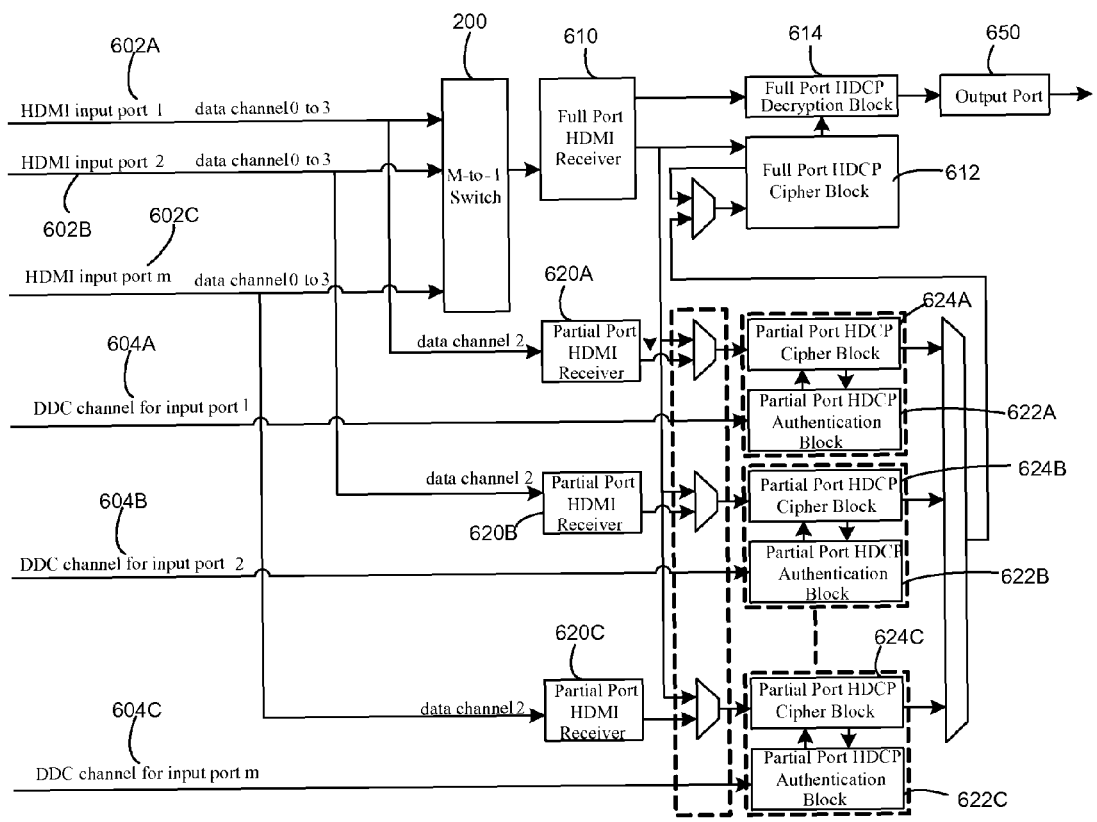
FIG. 6 illustrates a block diagram of a multimedia switching system with HDMI inputs.

FIG. 6 illustrates an example implementation of the switching system described above in conjunction with FIG. 2 and of the switching method described above in conjunction with FIG. 4. In the example of FIG. 6, the input ports 602 receive content formatted in a HDMI format, or type. It is noted that this is just an example and the principles described herein may applicable to other formats and corresponding data types.

In one embodiment, DDC channel input ports 604 are included to accompany the HDMI input ports 602. The HDMI input ports 602 are communicatively coupled with the M-to-1 switch 200 which outputs data to a full port HDMI receiver 610. The full port HDMI receiver 610 is communicatively coupled to a full port HDCP decryption block 614 and full port HDCP cipher block 612. The full port decryption block 614 receives data from the full port cipher block 612 and transmits data to the output port 650. Each of the HDMI input ports 602 are communicatively coupled to a partial port HDMI receiver 620 and a partial port HDCP cipher block 624 is communicatively coupled to a partial port authentication block 622, a partial port HDMI receiver 620 and the full port HDMI receiver 610. The partial port HDCP authentication blocks are also communicatively coupled to DDC channel input ports 604.

In the example shown by FIG. 6, the full port receiver 610 will decode received HDMI data from data channel 0 to data channel 2. The full port HDCP decryption block 614 shown in FIG. 6 decrypts input from a selected port and outputs the decrypted data to an output port 650. When switching input ports, the CP state of the full port HDCP cipher block 612 is loaded with a CP state stored in a partial port HDCP cipher block 624 corresponding to a selected port and updates the CP state using CP signaling from the full port HDMI receiver block 610.

The partial port HDMI receiver 620 decodes data from a subset of the channels, such as from channel 2. In HDMI, HDCP encryption status signaling is indicated by CTL3. When encryption is enabled, a multimedia source asserts a CTL3 signal in a specified window during VSYNC. When encryption is disabled, the multimedia source does not assert CTL3. When CTL3 is asserted by the multimedia source, a frame key is re-calculated. Hence, by decoding data on a subset of channels, such as channel 2, HDCP status is obtained.

A partial port HDCP authentication block 622 and a partial port HDCP cipher block 624 associated with an input port is configured to respond to an HDCP authentication request from a multimedia source as the authentication request is received. After the input port is authenticated, the CP state of the input port is synchronized with the corresponding multimedia source. The partial port HDCP cipher block 624 monitors the HDCP encryption status signaling from partial port HDMI receiver 620, or full port HDMI receiver 610, and updates the CP state as needed. The partial port HDCP cipher block 624 also generates a HDCP authentication value, Ri, and sends the authentication value to a corresponding partial port HDCP authentication block 622, which communicates the HDCP authentication value to the multimedia source device upon request. The HDCP authentication value, Ri, is used by multimedia source to perform link integrity verification.

Figure 7:
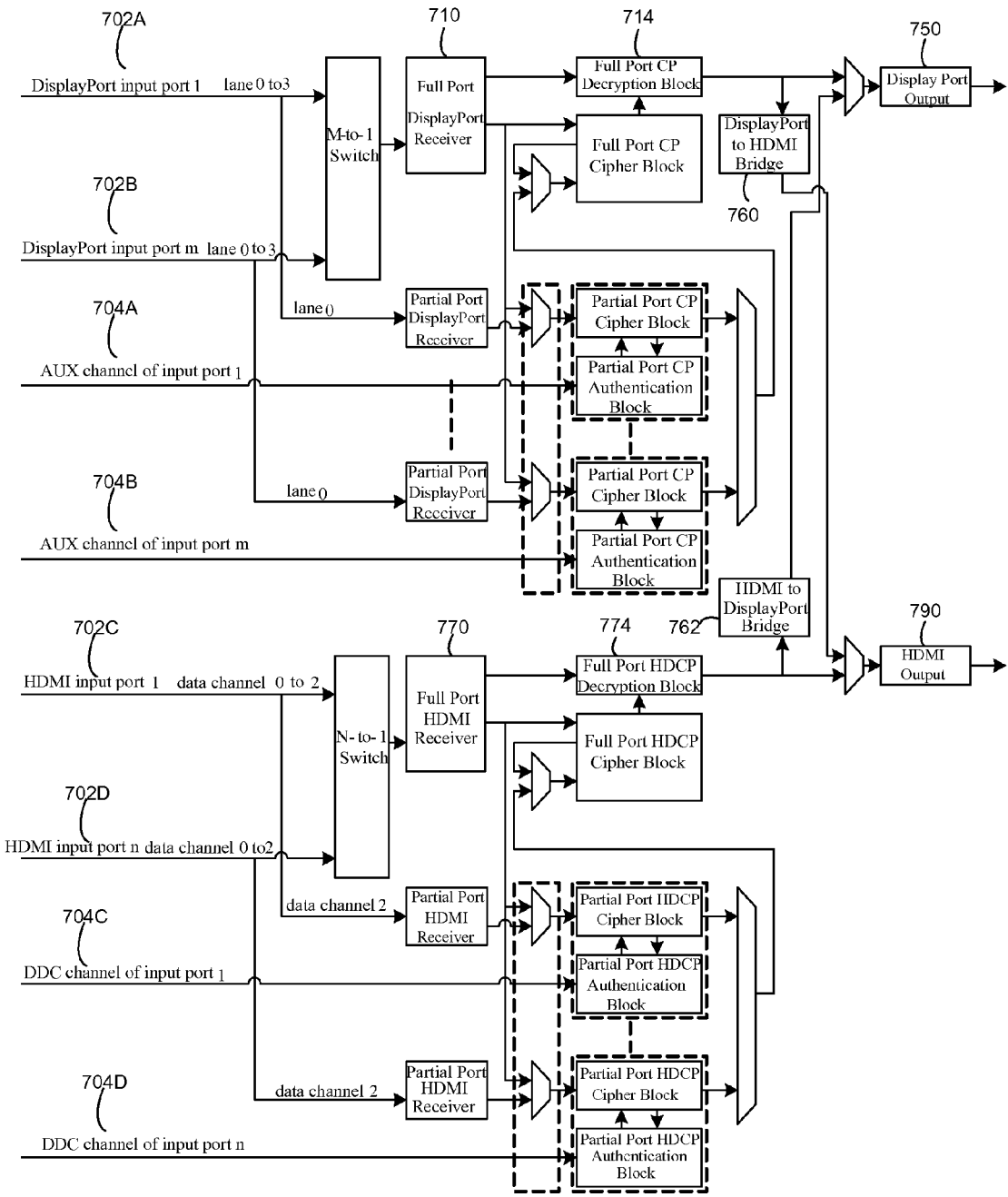
FIG. 7 illustrates a block diagram of a multimedia switching system with multiple input formats.

The switching system shown by FIG. 7 is a switching system having a mixed interface. It is noted that this is just an example and the principles described herein may applicable to other mixed interface formats and corresponding data types.

The input ports 702 in FIG. 7 use DISPLAYPORT and HDMI, although in other embodiments different and/or additional formats may be used. Each input port has a side band 704 which is determined by the input port format. The content protection link is established and synchronized with the corresponding multimedia source as described above in conjunction with FIGS. 5 and 6. In an embodiment, there is a full port receiver 710 and 770 for each of the input formats used in the system. Additionally, in the mixed interface embodiment, bridge circuits 760 and 762 are coupled to the outputs of the full port decryption blocks 714 and 774 to bridge signals from one interface type to another interface type. This allows an input port to be output in multiple output formats 750 and 790 regardless of its originating input format.

The switching system and method described above enable fast switching in a multimedia interface system with content protection. By using a partial port receiver for different input ports 702, the design of the switching system is simplified and silicon costs are reduced. Additionally, the switching system and method reduces switching delay by maintaining authentication of different input ports, eliminating re-authentication of a multimedia source when the input port providing input to the multimedia sink is switched.

In one embodiment, all of the connected input ports are partially decoded without any being output. This would be useful for operation in a low power state when no multimedia sink is connected and ready to receive output. Even with no output, CP signaling with each of the inputs is maintained in order to minimize the delay in output when a multimedia sink is connected.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The performance of certain of the operations may be distributed among the one or more processors, not only residing within a single machine, but deployed across a number of machines. In some example embodiments, the one or more processors or processor-implemented modules may be located in a single geographic location (e.g., a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The phrase "in one embodiment" in various places in the specification is not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for enabling fast switching in a multimedia interface system with content protection through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving data from a first device through a first multimedia interface having a first content protection scheme;
receiving data from a second device through a second multimedia interface having a second content protection scheme, the first multimedia interface and the second multimedia interface using different interface formats with respect to each other;
decoding the data received through the first multimedia interface and obtaining content protection signaling information for the first device;
decrypting by a decryption module the decoded data received through the first multimedia interface using the content protection signaling information obtained for the first device;
outputting the decrypted data received from the first device at an output port;
decoding a portion of the data received through the second multimedia interface and obtaining content protection signaling information for the second device prior to the second multimedia input being designated for output, the content protection signaling information of the second device comprising content protection encryption status of the second device;
receiving a port switching signal to cause data received by the second multimedia interface to be coupled to the output port and data received by the first multimedia interface to be decoupled from the output port;
decrypting by the decryption module the decoded the portion of the data received through the second multimedia interface using the protection signal information obtained for the second device; and
outputting the decrypted data received from the second device.

2. The method of claim 1, wherein the first multimedia interface is one of a DISPLAYPORT, HDMI and DVI input port.

3. The method of claim 1, wherein obtaining content protection signaling comprises establishing a connection such that a device is capable of transmitting protected media content.

4. The method of claim 1, wherein the first content protection scheme is different from the second content protection scheme, the first content protection scheme is HDCP or DPCP.

5. The method of claim 1, wherein the portion of the data decoded is the minimum amount of data needed to obtain content protection signaling information for the second device.

6. The method of claim 1, wherein outputting the data received from the first device and outputting the data received from the second device comprises displaying corresponding video on a display device.

7. A method comprising:
receiving data from a plurality of multimedia devices through a plurality of multimedia interfaces, each multimedia interface having a content protection scheme, the plurality of multimedia interfaces including at least two or more interface formats different with respect to each other;
decoding data received from a first multimedia device of the plurality of multimedia devices;
obtaining content protection signaling information for the first multimedia device of the plurality of multimedia devices;
decrypting by a decryption module the decoded data received the first multimedia device using the content protection signaling information obtained for the first multimedia device;
outputting the decrypted data received from the first multimedia device of the plurality of multimedia devices at an output port;
decoding a portion of data received through all of the plurality of multimedia interfaces having content protection;
obtaining content protection signaling information for each multimedia device within a group of the plurality of multimedia devices prior to input from a second multimedia device of the plurality of multimedia devices being designated for output, the content protection signaling information obtained for the second multimedia device comprising content protection encryption status of the second multimedia device;
receiving a port switching signal to designate data received by the second multimedia device to be coupled to the output port and data received by the first multimedia device to be decoupled from the output port;
decrypting by the decryption module the data received by the second multimedia device using the protection signal information for the second device; and
outputting the decrypted data received from the second multimedia device of the plurality of multimedia devices.

8. The method of claim 7, wherein the plurality of multimedia interfaces having content protection include at least one of DISPLAYPORT, HDMI and DVI as an input port.

9. The method of claim 8, wherein the plurality of multimedia interfaces include multiple input formats.

10. The method of claim 7, wherein a content protection scheme used by the first multimedia device is different from a content protection scheme used by the second multimedia device, the content protection scheme used by the first multimedia device is HDCP or DPCP.

11. The method of claim 7, wherein obtaining content protection signaling information comprises establishing a connection such that a device is capable of transmitting protected media content.

12. The method of claim 7, wherein decoding data from the first multimedia device of the plurality of multimedia devices comprises fully decoding the data.

13. The method of claim 7, wherein the portion of the data decoded is the minimum amount of data needed to obtain content protection signaling information with all of the plurality of multimedia devices.

14. A system comprising:
- a plurality of input ports for receiving data from a plurality of multimedia devices through a plurality of multimedia interfaces, each of the plurality of multimedia interfaces having a content protection scheme, the plurality of multimedia interfaces including at least two or more interface formats different with respect to each other;
- a partial port receiver configured to:
  - receive data from the first multimedia device of the plurality of multimedia devices,
  - for each of the plurality of multimedia device having content protection, decode a portion of data received by the respective device, and
  - obtain content protection signaling information for a second multimedia device of the plurality multimedia devices prior to input from a second multimedia device of the plurality of multimedia devices being designated for output using a decode portion of data by the second multimedia device, the content protection signaling information of the second device comprising content protection encryption status of the second device; and
- a decryption block configured to decrypt decoded data from the first multimedia interface using the content protection signaling information obtained for the first multimedia device and decrypt decoded data from the second multimedia device using the content protection signaling information obtained for the second multimedia device;
- a content output block for outputting the data received from the first multimedia device of the plurality of multimedia devices and switching to outputting the data received from the second multimedia device of the plurality of multimedia devices responsive to a port switching signal indicating a selected multimedia device has changed from the first multimedia device to the second multimedia device.

15. The system of claim 14, wherein obtaining copy protection signaling comprises establishing a connection such that a device is capable of transmitting protected media content.

16. The system of claim 14, wherein a content protection scheme used by the first multimedia device is different from a content protection scheme used by the second multimedia device, the content protection scheme used by the first multimedia device is HDCP or DPCP.

17. The system of claim 14, wherein the plurality of input ports include one of DISPLAYPORT, HDMI and DVI formats.

18. The system of claim 14, wherein the partial port receiver decodes a portion of the data received by the plurality of multimedia devices to obtain content protection signaling information for all of the plurality of multimedia devices, the partial port receiver leaving any other data received the plurality of multimedia devices undecoded.

19. The system of claim 14, further comprising:
- a partial port content protection cipher block configured to store content protection state information of the second multimedia device of the plurality of multimedia devices; and
- a full port content protection cipher block configured to store content protection state information of the first multimedia device of the plurality of multimedia devices.

20. The system of claim 19, wherein data stored by full port content protection cipher block is replaced with the content protection state information of the second multimedia device of the plurality of multimedia devices from the partial port content protection cipher block.

21. A method comprising:
- receiving, at a partial interface port receiver, a content protection request from a first interface port;
- authenticating the first interface port responsive to receiving the content protection request, the first interface port configured to receive coded data from a source, the coded data comprising multimedia data and content protection signaling information;
- decoding, by the partial interface port receiver, the content protection signaling information from the coded data received by the first interface port;
- determining, by a partial port cipher module, a content protection state of the first interface port using the content protection signaling information of the first interface port decoded by the partial interface port receiver;
- storing the content protection state of the first interface port determined by the partial port cipher module in a full port cipher module;
- updating content protection state of the first interface port stored in the full port cipher module based at least in part on the content protection signaling information obtained from the first interface port receiver;
- decoding the multimedia data received by the first interface port;
- decrypting the multimedia data received by the first interface port using content protection state stored in the full port cipher module; and
- outputting the decrypted data by the output port.

* * * * *